United States Patent
Motegi et al.

(10) Patent No.: US 9,102,213 B2
(45) Date of Patent: Aug. 11, 2015

(54) VEHICLE AIR-CONDITIONER CONTROL SYSTEM AND FUEL SUPPLY CUT-OFF

(75) Inventors: Yugo Motegi, Yokohama (JP); Tadashi Iwamoto, Kawasaki (JP); Takashi Watanabe, Machida (JP); Tetsuya Fuke, Ebina (JP); Tetsuya Furumaya, Sagamihara (JP)

(73) Assignee: Nissan Motor Co., Ltd., Kanagawa (JP)

(*) Notice: Subject to any disclaimer, the term of this patent is extended or adjusted under 35 U.S.C. 154(b) by 548 days.

(21) Appl. No.: 13/529,186

(22) Filed: Jun. 21, 2012

(65) Prior Publication Data

US 2012/0324929 A1 Dec. 27, 2012

(30) Foreign Application Priority Data

Jun. 21, 2011 (JP) ................. 2011-137300

(51) Int. Cl.
*B60H 1/32* (2006.01)
*B60H 1/00* (2006.01)
*F02D 41/12* (2006.01)

(52) U.S. Cl.
CPC .......... *B60H 1/00764* (2013.01); *B60H 1/3208* (2013.01); *B60H 2001/327* (2013.01); *B60H 2001/3266* (2013.01); *F02D 41/123* (2013.01); *F02D 41/126* (2013.01)

(58) Field of Classification Search
CPC ............. B60H 1/00764; B60H 1/3208; B60H 2001/3266; F02D 41/123
USPC ............................ 62/61, 133, 241, 244, 323.4
See application file for complete search history.

(56) References Cited

U.S. PATENT DOCUMENTS

| 4,402,295 | A | * | 9/1983 | Ono ............................... 123/493 |
| 5,271,368 | A | * | 12/1993 | Fujii et al. ..................... 123/493 |
| 6,691,522 | B1 | * | 2/2004 | Kojima ........................... 62/133 |
| 6,715,303 | B2 | | 4/2004 | Masuda et al. |

(Continued)

FOREIGN PATENT DOCUMENTS

| EP | 1600618 A2 | 11/2005 |
| EP | 2535216 A1 | 12/2012 |

(Continued)

OTHER PUBLICATIONS

Office Action in counterpart Chinese Application No. 201210119284.7 dated Mar. 28, 2014 (5 pages).

(Continued)

*Primary Examiner* — Jonathan Bradford
(74) *Attorney, Agent, or Firm* — Osha Liang LLP

(57) ABSTRACT

A vehicle air conditioner control system has an air conditioning device for performing a refrigerating cycle, having a compressor that intakes, compresses, and discharges a refrigerant, a condenser that condenses the refrigerant discharged from the compressor, an expansion valve that depressurizes the refrigerant condensed by the condenser, an evaporator that performs heat exchange between open air and the refrigerant to vaporize the refrigerant, a compressor ON/OFF control device that controls a running rate of the compressor by alternating between an ON state and an OFF state, a vehicle deceleration fuel cut-off executing device that performs cut-off fuel supply during vehicle deceleration, and a fuel supply recovery executing device that cancels fuel cut-off and recovers fuel supply during vehicle deceleration fuel cut-off period based on a demand to turn on the compressor.

10 Claims, 5 Drawing Sheets

(56) References Cited

U.S. PATENT DOCUMENTS

| | | | |
|---|---|---|---|
| 7,100,383 B2 * | 9/2006 | Sugesawa et al. | 62/133 |
| 2003/0192326 A1 | 10/2003 | Masuda et al. | |

FOREIGN PATENT DOCUMENTS

| | | |
|---|---|---|
| JP | 5-38935 A | 2/1993 |
| JP | 07-034929 A | 3/1995 |
| JP | 2003-306031 A1 | 10/2003 |
| JP | 2005-075066 A | 3/2005 |
| JP | 4337633 B | 12/2005 |

OTHER PUBLICATIONS

Office Action Issued in corresponding Japanese Application No. 2011-137300, mailed Nov. 18, 2014 (3 pages).

Extended European Search Report issued in European Application No. 12162576.7, mailed on May 15, 2013 (5 pages).

Office Action issued in corresponding Chinese Application No. 201210119284.7, mailed on Jan. 13, 2015 (6 pages).

* cited by examiner

VEHICLE AIR-CONDITIONER CONTROL SYSTEM AND FUEL SUPPLY CUT-OFF

BACKGROUND OF THE DISCLOSURE

1. Field of the Disclosure

The present invention relates to control a vehicle air-conditioner, particularly during vehicle deceleration fuel cut-off.

2. Description of the Related Art

Recently, there have been proposed and developed various fuel cut-off systems which are designed to reduce exhaust emissions and fuel consumption by cutting fuel supply to the engine cylinder or cylinders through the fuel cut-off control. The fuel cut-off control is frequently performed under certain required engine/vehicle operating conditions, such as during vehicle deceleration, during coasting, or during down-hill operation. Vehicle deceleration fuel cut-off is defined as the fuel cut-off control while the vehicle is decelerated.

On the other hand, many cars are equipped with automatic transmissions with so-called lock-up torque converters which act to mechanically couple the engine crankshaft to the transmission output shaft. When a lock-up device incorporated in the lock-up torque converter assumes its converter state (corresponding to a lock-up clutch release position), the engine crankshaft and the transmission output shaft are coupled via fluid in the torque converter in normal operation. When the lock-up device assumes its locked-up state (corresponding to a lock-up clutch engagement position), the engine crankshaft and the transmission output shaft are directly coupled to each other by a mechanical connection (via the lock-up clutch being engaged), thus disabling or locking up the torque converter. The converter state will be hereinafter referred to as a "lock-up OFF state," whereas the locked-up state will be hereinafter referred to as a "lock-up ON state."

The four engine rotation speeds are defined (from the high side) as Nrls1: a lockup clutch disengaging engine rotation speed when the air compressor 1 is driven; Nrcv1: a fuel supply recovery engine rotation speed when the air compressor 1 is driven; Nrls2: a lockup clutch disengaging engine rotation speed when the air compressor 1 is not driven; and Nrcv2: a fuel supply recovery engine rotation speed when the air compressor 1 is not driven.

The command signal for disengaging lock-up clutch occurs while coasting ("coast driving") at the engine rotation speed between Nrls1 and Nrcv2 when the compressor receives a demand to be on according to the temperature of vehicle compartment becoming high. The conventional control system cancels fuel cut-off and turns on the compressor for the air-conditioner at the moment when the lock-up clutch has actually disengaged. If the system cancels fuel cut-off at the same moment as the command signal for disengaging lock-up clutch, a torque shock is generated because of disengagement delaying mechanically. Fuel supply is resumed with the lockup clutch being in an engaged state, and an output torque of the engine rapidly increases and is directly transmitted to the transmission via the lockup clutch due to resumption of fuel supply. Thus, a torque shock called a recovery shock is generated, thereby imposing discomfort on a driver and a passenger(s). Accordingly, the conventional control system described in Patent Document 1 cancels fuel cut-off after the delay of disengagement.

[Patent Document 1]
Japanese Patent No. 4337633

SUMMARY OF THE CLAIMED SUBJECT MATTER

According to one or more embodiments of the present disclosure, a vehicle air conditioner control system comprises an air conditioning device for performing a refrigerating cycle, comprising a compressor that intakes, compresses, and discharges a refrigerant, a condenser that condenses the refrigerant discharged from the compressor, an expansion valve that depressurizes the refrigerant condensed by the condenser, an evaporator that performs heat exchange between open air and the refrigerant to vaporize the refrigerant, a compressor ON/OFF control device that controls a running rate of the compressor by alternating between an ON state and an OFF state, a vehicle deceleration fuel cut-off executing device that performs cut-off fuel supply during vehicle deceleration, and a fuel supply recovery executing device that cancels fuel cut-off and recovers fuel supply during vehicle deceleration fuel cut-off period based on a demand to turn on the compressor. The compressor ON/OFF control device keeps the OFF state of the compressor and prohibits fuel supply recovery even when the demand to turn on the compressor is generated, if a vehicle speed is between a first vehicle speed for fuel supply recovery with the demand to turn off the compressor and a second vehicle speed for fuel supply recovery with the demand to turn on the compressor during deceleration fuel cut-off with OFF state of the compressor.

According to one or more embodiments of the present disclosure, whether the compressor ON/OFF control device maintains the OFF state of the compressor and prohibits fuel supply recovery is decided according to a load on the refrigerating cycle R.

According to one or more embodiments of the present disclosure, the load on the refrigerating cycle R is determined based on an atmospheric temperature, a higher limit temperature to keep the OFF state of the compressor is determined according to the atmospheric temperature, and the compressor ON/OFF control device decides to maintain the OFF state of the compressor and to prohibit fuel supply recovery when a temperature of the evaporator is equal to or lower than the higher limit temperature.

According to one or more embodiments of the present disclosure, a period in which the compressor ON/OFF control device maintains the OFF state of the compressor and prohibit fuel supply recovery is terminated at the vehicle speed for fuel supply recovery with the OFF state of the compressor.

According to one or more embodiments of the present disclosure, a vehicle air conditioner control system comprises an air conditioning device for performing a refrigerating cycle, comprising a compressor that intakes, compresses, and discharges a refrigerant, a condenser that condenses the refrigerant discharged from the compressor, an expansion valve that depressurizes the refrigerant condensed by the condenser, an evaporator that performs heat exchange between open air and the refrigerant to vaporize the refrigerant, a compressor ON/OFF control means that controls a running rate of the compressor by alternating between an ON state and an OFF state, a vehicle deceleration fuel cut-off executing means that performs cut-off fuel supply during vehicle deceleration, and a fuel supply recovery executing means that cancels fuel cut-off and recovers fuel supply during vehicle deceleration fuel cut-off period based on a demand to turn on the compressor. The compressor ON/OFF control means keeps the OFF state of the compressor and prohibits fuel supply recovery even when the demand to turn on the compressor is generated, if a vehicle speed is between a first vehicle speed for fuel supply recovery with the demand to turn off the compressor and a second vehicle speed for fuel supply recovery with the demand to turn on the compressor during deceleration fuel cut-off with OFF state of the compressor.

According to one or more embodiments of the present disclosure, whether the compressor ON/OFF control means maintains the OFF state of the compressor and prohibits fuel supply recovery is decided according to a load on the refrigerating cycle R.

According to one or more embodiments of the present disclosure, the load on the refrigerating cycle R is determined based on an atmospheric temperature, a higher limit temperature to keep the OFF state of the compressor is determined according to the atmospheric temperature, and the compressor ON/OFF control means decides to maintain the OFF state of the compressor and to prohibit fuel supply recovery when a temperature of the evaporator is equal to or lower than the higher limit temperature.

According to one or more embodiments of the present disclosure, a period in which the compressor ON/OFF control device maintains the OFF state of the compressor and prohibit fuel supply recovery is terminated at the vehicle speed for fuel supply recovery with the OFF state of the compressor.

DETAILED DESCRIPTION

Figure 1:
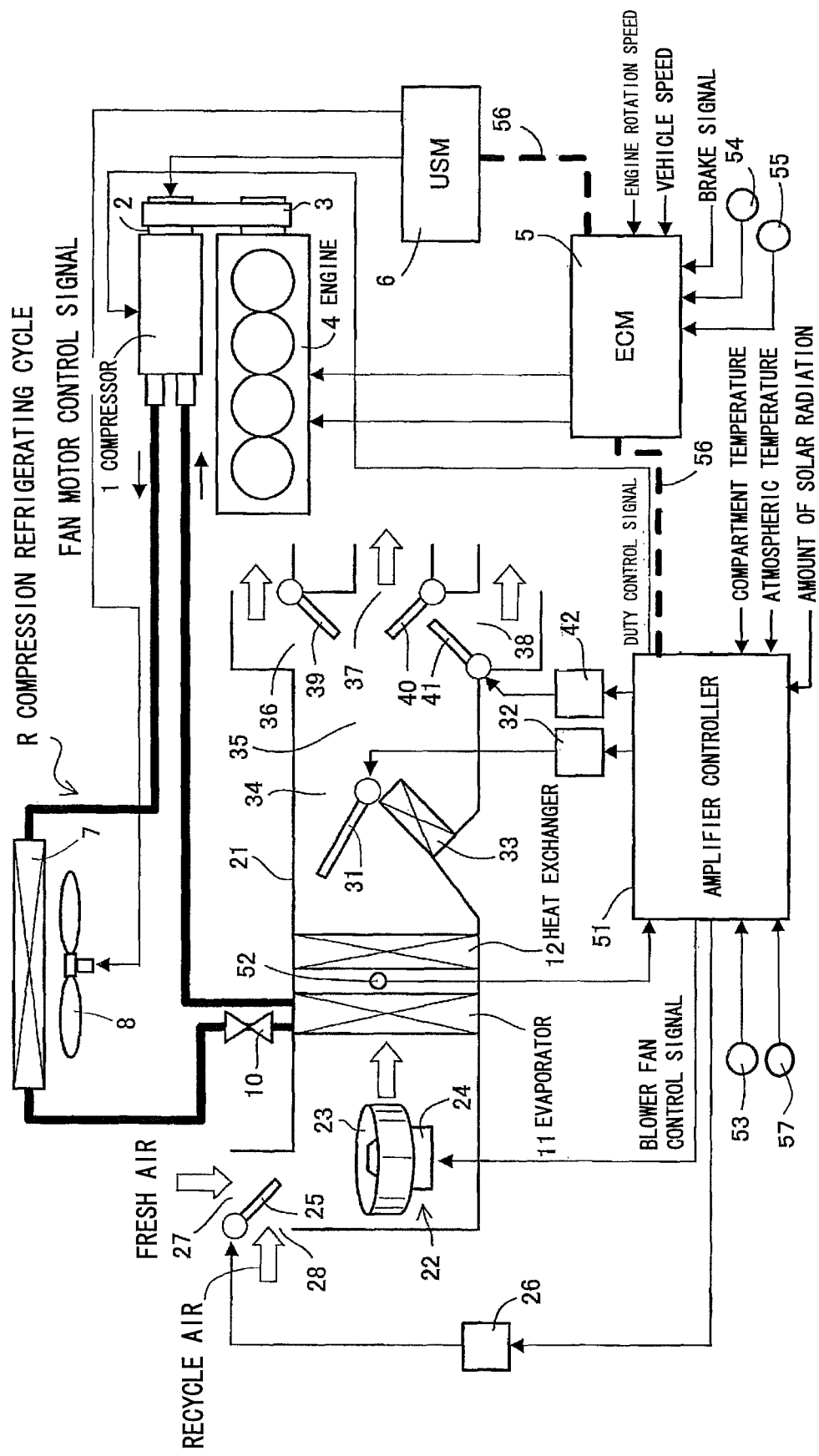
FIG. 1 shows a schematic system diagram of the vehicle air conditioner according to one or more embodiments of the present disclosure.

Hereinafter, embodiments of the present disclosure will be described in detail with reference to the drawings. In embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid obscuring the disclosure.

In patent document 1, the control system cancels fuel cut-off after a predetermined period from the moment when the system commands disengagement of the lock-up clutch according to a compressor ON signal at the engine rotation speed between Nrls1 and Nrcv2. Patent document 1 is not concerned with the load on refrigerating cycle, and is able to improve fuel efficiency.

A device according to one or more embodiments of the present disclosure extends a fuel cut-off period when the demand for the compressor is turned on between the moment when the vehicle reaches a speed of fuel supply recovery with air-conditioner ON and the moment when the vehicle reaches a speed of fuel supply recovery with air-conditioner OFF.

The vehicle air conditioner control system according to one or more embodiments of the present disclosure comprises a compression refrigerating cycle R including a compressor that intakes, compresses and discharges a refrigerant, a condenser that condenses a high temperature and high pressure refrigerant discharged from the compressor, an expansion valve 10 that depressurizes the refrigerant condensed by the condenser such that the refrigerant is at low pressure, and an evaporator that performs heat exchange between open air and the refrigerant, which in turn vaporizes the refrigerant.

According to one or more embodiments of the present disclosure, the vehicle air conditioner control system comprises a compressor control means that controls the running of compressor, a vehicle deceleration fuel cut-off executing means that performs cut-off of fuel supply during vehicle deceleration, and a fuel supply recovery executing means that cancels fuel cut-off and recovers fuel supply at an earlier time in a condition of the vehicle deceleration fuel cut-off with air-conditioner ON than in a condition of the vehicle deceleration fuel cut-off with air-conditioner OFF. The compressor control means keeps the compressor turned off and prohibits fuel supply recovery in the condition that the demand of compressor turning on is generated between the moment when the vehicle reaches a speed of fuel supply recovery with air-conditioner ON and the moment when the vehicle reaches a speed for fuel supply recovery with air-conditioner OFF during deceleration fuel cut-off.

According to one or more embodiments of the current disclosure, fuel cut-off period is extended and fuel efficiency is improved in comparison with the conventional system, which turns the compressor on and cancels fuel cut-off immediately in the condition that the demand of compressor turning on is generated between the moment when the vehicle reaches a speed of fuel supply recovery with air-conditioner ON and the moment when the vehicle reaches a speed of fuel supply recovery with air-conditioner OFF during deceleration fuel cut-off.

As shown in FIG. 1, a compression refrigerating cycle of the vehicle air conditioner R according to one or more embodiments of the present disclosure includes compressor 1, condenser 7, expansion valve 10, and evaporator 11. Compressor 1 has electromagnetic clutch 2 for intermittent power supply and intakes, compresses and discharges a refrigerant. The power of engine 4 is transmitted to compressor 1 through electromagnetic clutch 2 and belt 3, so that the running of compressor 1 is intermitted by intermitting electrification to electromagnetic clutch 2 by engine control module 5 and under switching module 6.

The gaseous refrigerant at high temperature and the high pressure is discharged from compressor 1 and then flows into condenser 7. The refrigerant is cooled by heat exchange with outer air sent by cooling fan 8 and condenses. The refrigerant condensed by condenser 7 is depressurized by expansion valve 10 to low pressure, and becomes two aspect states of the liquid and gas at low pressure. The low pressure refrigerant from expansion valve 10 flows into evaporator 11.

Evaporator 11 is installed in air conditioning case 21 of the vehicle air conditioner, and the low pressure refrigerant that flows into evaporator 11 cools air in air conditioning case 21, and the refrigerant is heated and evaporates. The exit of evaporator 11 is coupled by the intake side of compressor 1. The compression refrigerating cycle R comprises a closed circuit in this way.

In air conditioning case 21, blower 22 is arranged upstream of evaporator 11, and comprises blower fan 23 and driving motor 24. In the intake side of blower fan 23, fresh air inlet port 27 and recycled air inlet port 28 is opened and closed by air selecting door 25. Fresh air (air from outside compartment) or recycled air (air from within car compartment) is selected by this air selecting door 25. The air selecting door 25 is driven by electric drive device 26 comprising servomotors.

Additionally, heat exchanger 12 (described below) and air mixture door 31 are sequentially arranged downstream of evaporator 11. Heater core (heat exchanger for heating) 33 is installed downstream of air mixture door 31 and heats air with warm water (coolant) heated by engine 4. Bypass passages 34 disposed adjacent (on the upper portion in FIG. 1) to the heater core 33 allows air (a cold wind) that bypasses heater core 33 to flow therethrough.

Air mixture door 31 is a pivotable board-shaped door, and is driven by electric drive device 32 comprising servomotors. Air mixture door 31 regulates a quantity of wind ratio of the warm air passing heater core 33 and a cold air passing bypass passages 34, and air temperature to a compartment is regulated by the adjustment of the quantity of wind ratio.

Air mixture area 35 is installed downstream of heater core 33 and bypass passages, where warm air from warm heater core 33 and cold air from bypass passages 34 mix, thereby creating air of a predetermined temperature.

Downstream of air mixture area 35, defroster aperture 36, face aperture 37 and foot aperture 38 are formed. Each aperture is opened or closed by defroster door 39, face door 40, and foot door 41, each of which is a pivotable board. The three doors 39, 40 and 41 are coupled by common linkage, and are driven by electric drive device 42 comprising servomotors through this linkage. For example, when defroster door 39 opens, air blows out to the windshield inside through a defroster duct (not illustrated). When face aperture 37 opens, air begins to blow for the upper part of a passenger's body in the compartment through the face duct (not illustrated). When foot aperture 38 opens, air blows out through the foot duct (not illustrated) to the feet of the passenger in the compartment.

Evaporator temperature (evaporator outflow temperature) from temperature sensor 52 and an air-conditioner input signal from air-conditioner switch 53 are input into amplifier controller 51 (a compressor running rate control means). When air-conditioner switch 53 is in an ON state, the control amplifier 51 outputs a duty signal to the compressor 1 to control the compressor running rate so that real evaporator temperature detected by temperature sensor 52 is adjusted to a target temperature of evaporator 11.

When air-conditioner switch 53 is turned on, amplifier controller 51 transmits an operating signal for compressor 1 to engine control module 5 by CAN communication 56. The control amplifier 51 controls blower fan driving motor 24 so that target quantity of air flow is provided and controls electric drive device 26, 32 and 42 for the automatic control of an outlet air and an inlet air.

Engine control module 5 controls a quantity of fuel injection to engine 4, fuel injector timing, and the ignition time based on the signal from various sensors detecting a driving state of engine 4.

Refrigerant pressure from refrigerant pressure sensor 54 and an accelerator opening ratio from accelerator sensor 55 are input into engine control module 5. When it is judged that engine control module 5 can operate compressor 1 by these signals, a compressor ON signal is transmitted to under switching module 6 by CAN communication 56. When a compressor ON signal is received from engine control module 5, switching module 6 turns on an air-conditioner relay in module 6 and operates compressor 1 by connecting electromagnetic clutch 2.

Engine control module 5 (a vehicle deceleration fuel cut-off executing means) performs a fuel cut-off at the time of the slowdown of the vehicle for mileage improvement. Additionally, engine control module 5 (a fuel supply recovery executing means) cancels a fuel cut-off and recovers fuel supply at a higher vehicle speed in the condition of the vehicle deceleration fuel cut-off and air-conditioner ON than a vehicle speed at which engine control module does in the condition of the vehicle deceleration fuel cut-off and air-conditioner OFF. Here, the condition of air-conditioner ON is defined as air-conditioner switch 53 being in an ON state (in other words, running demand time of compressor 1), and the condition of air-conditioner OFF is defined as air-conditioner switch 53 being in an OFF state (in other words, running non-demand time of compressor 1).

Heat exchanger 12 is disposed immediately downstream of evaporator 11. Because the shape of heat exchanger 12 is same in front area as the evaporator 11, as shown in FIG. 1, the gross volume of cold wind (a gross volume of the wind in air conditioning case 21) passes heat exchanger 12 after evaporator 11. Thus, heat exchanger 12 can be a small thin structure of depth dimensions to an air flow direction in air conditioning case 21.

For example, according to one or more embodiments of the present disclosure, heat exchanger 12 has a tubular member formed of metal such as the aluminum, which has superior heat conductance, and refrigerant is sealed up inside of this tubular member. According to one or more embodiments of the present disclosure, a plurality of tubular members are disposed with gaps therebetween, and air passes through the gap between the plurality of tubular members. However, heat exchanger 12 is not limited to the above.

The four engine rotation speeds are defined (from the high side) as Nrls1: a lockup clutch disengaging engine rotation speed when the air compressor 1 is driven; Nrcv1: a fuel supply recovery engine rotation speed when the air compressor 1 is driven; Nrls2: a lockup clutch disengaging engine rotation speed when the air compressor 1 is not driven; and Nrcv2: a fuel supply recovery engine rotation speed when the air compressor 1 is not driven.

The command signal for disengaging lock-up clutch is generated under the coast driving at the engine rotation speed between Nrls1 and Nrcv2 when compressor 1 receives a demand to turn on according to the temperature of vehicle compartment becoming high. Coast driving is the vehicle driving state in which the vehicle runs by inertia with fuel cut-off, while the engine rotation speed Ne falls down gradually. The conventional control system cancels fuel cut-off, and turns on the compressor for air-conditioner at the moment when the lock-up clutch has actually disengaged.

Thus, the conventional control system cancels fuel cut-off after a predetermined period from the moment when it commands disengagement of lock-up clutch according to compressor ON signal at the engine rotation speed between Nrls1 and Nrcv2. The convention control system is not concerned with the load on refrigerating cycle such as atmospheric temperature and pressure of refrigerant, so the fuel efficiency is able to be improved.

Figure 2:
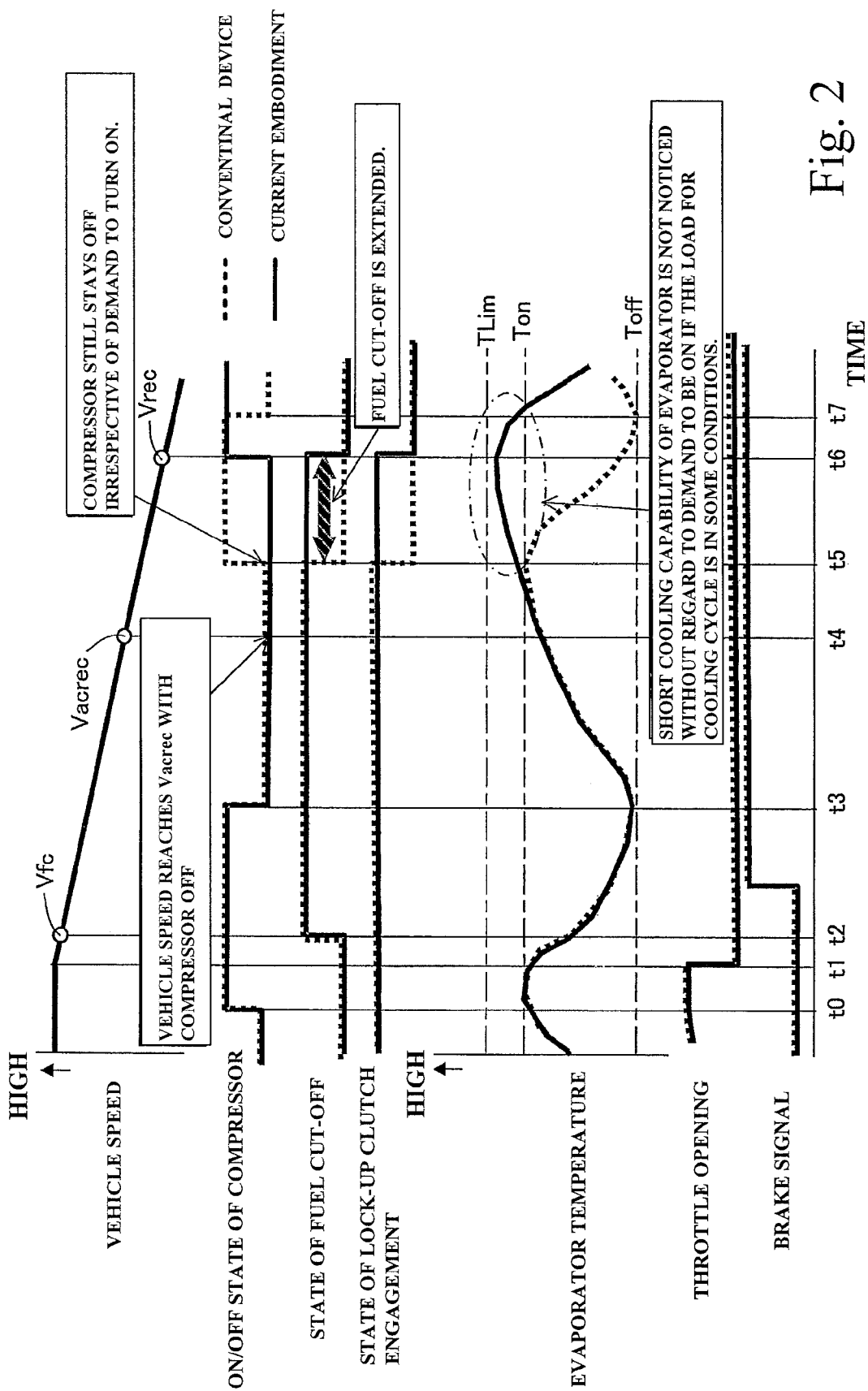
FIG. 2 shows time charts showing changes such as vehicle speed in vehicle deceleration fuel cut-off, the state of the compressor ON/OFF, the state of fuel cut-off, etc.

This is explained with reference to FIG. 2. The time chart of FIG. 2 shows changes such as vehicle speed, ON/OFF state of compressor 1, evaporator temperature, etc., during the period of deceleration fuel cut-off in a model. A change to these parameters according to one or more embodiments of the present disclosure is shown by solid lines, while changes to these parameters in a conventional device is shown by broken lines.

According to the conventional control system, the fuel supply recovery time is defined by engine rotation speed. This is envisaged because engine rotation speed provides an accurate estimate as to whether an engine stall occurs. However, other parameters are also available with which whether an engine stall occurs can be judged. For example, the fuel supply recovery time may be measured or predicted based on a predetermined vehicle speed. In one or more embodiments of the present disclosure, the fuel supply recovery time is defined by a vehicle speed. In one or more embodiments of the present disclosure, engine rotation speed is also available.

In FIG. 2, fuel cut-off is canceled and fuel supply is recovered when the vehicle speed is less than the vehicle speed Vacrec with air-conditioner ON. Air-conditioner ON means that compressor 1 is running. Other hand, fuel cut-off is canceled and fuel supply is recovered when the vehicle speed is less than the vehicle speed Vrec with air-conditioner OFF. Vrec is the vehicle speed for fuel supply recovery with air-conditioner OFF.

In FIG. 2, accelerator opening becomes zero at a moment for t1 at the a vehicle speed (for example, 100 km/h) because an accelerator pedal is returned, and the vehicle speed fall down linearly. If vehicle speed at that time is below vehicle speed Vfc for fuel cut-off, the condition of fuel cut-off is formed, and fuel cut-off flag is set to "1" at moment t2. Engine control module 5 executes fuel cut-off when the fuel cut-off flag is "1".

A conventional device controls the compressor on/off generally. This control method sets evaporator temperature Ton to require a compressor turning ON and evaporator temperature Toff (Toff<Ton) to require compressor turning OFF. The controller repeats an ON state (working conditions) and an OFF state (non-working conditions) of compressor 1 by an approximately constant period so that evaporator temperature is settled between these two temperatures.

Compressor 1 is turned ON from t0 (which is before t1), and turned off at t3 under deceleration fuel cut-off. Thus, the general compressor operation which repeats compressor on and off will be stopped after t3 when engine 4 cannot drive compressor under fuel cut-off. As a result of this, the temperature of evaporator rises after t3.

Capability of refrigeration cycle R falls down by evaporator temperature rising up from t3, and the request for compressor to turn on is generated at t5. Fuel supply recovery is executed immediately at t5 because vehicle speed V is less than vehicle speed Vacrec for fuel supply recovery with the air-conditioner ON, and compressor 1 turns on according to the request for compressor to turn on. The general compressor operation which repeats compressor on and off restarts, and the temperature of evaporator falls down from t5. Compressor 1 turns off at t7 when the temperature of evaporator arrives at evaporator temperature Toff, which require compressor to turn OFF.

If a request for compressor to turn on at t5 was not generated, the conventional device would be able to cut fuel until a moment for t6 when vehicle speed arrives at vehicle speed Vrec for fuel supply recovery with the air-conditioner OFF. However, because the conventional device generates the request to turn on the compressor at t5, the period of fuel cut-off is cancelled from t5 to t6.

Evaporator temperature Toff that requires compressor 1 to turn off is the threshold to prevent evaporator from freezing. Evaporator temperature Ton that requires the compressor 1 to turn on is the threshold to prevent cooling capability in the vehicle compartment from falling down. Evaporator temperature Ton that requires the compressor 1 to turn on is designed to prevent cooling capability in the vehicle compartment from falling down in condition that refrigerating cycle R is running in a predetermined atmospheric temperature. Evaporator temperature Toff that requires the compressor 1 to turn off is designed to prevent evaporator from freezing in condition that refrigerating cycle R is running in a predetermined atmospheric temperature. The predetermined atmospheric temperature is atmospheric temperature in design procedure.

Thus, sometimes, a driver does not feel hot when the temperature of evaporator is higher than Ton, because the temperature that the driver experiences is different depending on actual atmospheric temperature (load on the refrigerating cycle) whenever the temperature of evaporator is the same. For example, when the actual atmospheric temperature is lower than the predetermined atmospheric temperature, and the heat is released more than it is at predetermined atmospheric temperature, a driver does not feel hot whenever the temperature of evaporator 11 is higher than that in design procedure.

According to one or more embodiments of the present disclosure, TLim is the higher limit temperature of evaporator 11 when compressor 1 is kept off. The driver does not feel hot when the temperature of evaporator is TLim because the actual atmospheric temperature is lower than the predetermined atmospheric temperature. The higher limit temperature TLim of evaporator 11 when compressor 1 is kept off is higher than the evaporator temperature Ton that requires compressor turning on, as shown in the fifth chart in FIG. 2.

The driver does not feel hot before the temperature of evaporator 11 rises to TLim even though the request for compressor turns on at t5, if the actual atmospheric temperature is lower than predetermined atmospheric temperature. Thus, according to one or more embodiments of the present disclosure, compressor 1 is kept turned off according to driver feeling until the temperature of evaporator 11 arrives at higher limit temperature TLim. As a result, fuel efficiency is improved with the period of fuel cut-off being extended.

In one or more embodiments of the present disclosure, fuel supply recovery is prohibited and compressor 1 is kept turned off, even when the request for compressor to turn on is generated in the period from Vacrec to Vrec during deceleration fuel cut-off.

The control of compressor ON/OFF during deceleration fuel cut-off executed by amplifier controller 51 is explained in more detail with reference to the flowchart in FIG. 3. The procedure is executed once every predetermined period (for example, every 10 ms).

First it is evaluated in step Si whether or not compressor 1 is in OFF state (running condition). When compressor 1 is in ON state (running condition), the process proceeds to step S12. In step S12, evaporator temperature Teva, which is detected by temperature sensor 52, is compared with evaporator temperature Toff to determine whether the compressor 1 should be turned off. If Teva is equal to or lower than Toff, the process proceeds to step S13, wherein compressor 1 is turned off to prevent freezing. If Teva is higher than Toff, the process proceeds to step S14, wherein compressor 1 is kept in ON state.

If compressor 1 is in OFF state in step S1, the process proceeds to step 2, wherein evaporator temperature Teva detected by temperature sensor 52 is compared with evaporator temperature Ton. If Teva is lower than Ton, process is finished with no operation.

If Teva is equal to or higher than Ton, it is determined that amplifier controller 51 needs to turn the compressor on to increase the cooling power of evaporator 11 to prevent cooling power of evaporator from falling down in the case that the actual atmospheric temperature is same as the predetermined atmospheric temperature. However, sometimes the air-conditioning in the vehicle compartment is comfortable without recovering fuel supply immediately under fuel cut-off because the air-conditioning in the vehicle compartment is influenced by the actual atmospheric temperature. In this case, fuel supply recovery is prohibited, and compressor 1 is kept off to improve fuel efficiency.

It is evaluated in step S3, S4 and S5 whether the vehicle compartment is comfortable with fuel supply recovery being prohibited and the compressor 1 kept in the OFF state. Whenever the following three requirements are fulfilled, it is determined that the vehicle compartment is comfortable with fuel supply recovery being prohibited, and compressor 1 kept in the OFF state.

<Requirement 1> Requirement 1 is that, in step S3, a determination is made that deceleration fuel cut-off has been executed. The execution of fuel cut-off at start point is needed to keep fuel cut-off after this point, which is why Requirement 1 is required. For example, if throttle opening angle is zero (an accelerator pedal is returned), and vehicle speed is beyond vehicle speed Vfc for starting deceleration fuel cut-off, the condition of fuel cut-off is generated and the fuel cut-off flag is set to "1". Engine control module 5 cuts the fuel off when the fuel cut-off flag is "1". Step 4 is selected if the fuel cut-off is presumed to be executing as the fuel cut-off flag is "1" in step S3.

<Requirement 2> Requirement 2 is that, in step S4, the vehicle speed is determined to be between Vrec and Vacrec. That is, the vehicle speed V is in the range Vrec<V<Vacrec. In this range, the period of fuel cut-off is not extended if fuel supply is recovered and compressor 1 is turned on immediately, according to the request for compressor to turn on.

<Requirement 3> Requirement 3 is that, in step S5, the evaporator temperature Teva detected by temperature sensor 52 is determined to be equal to or lower than higher limit temperature TLim of evaporator 11 for the compressor 1 to be kept OFF. It is evaluated in step S5 whether the air-conditioning in vehicle compartment is comfortable even if fuel supply recovery is prohibited and compressor 1 is kept OFF. TLim is variable according to the load on refrigerating cycle R, because the comfort level is affected by the load.

Figure 4:
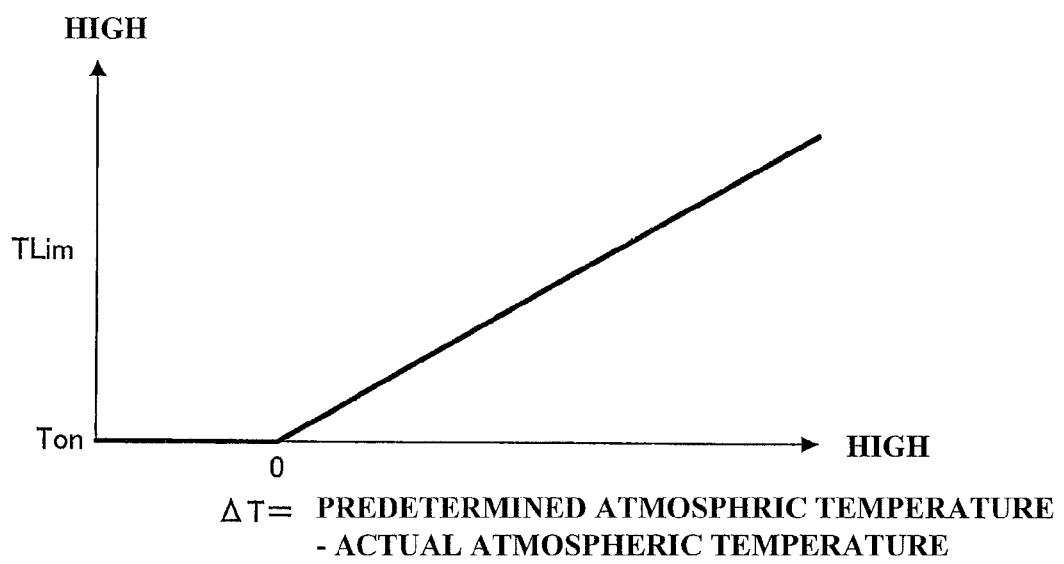
FIG. 4 is a graph showing a relationship between a higher limit temperature of the evaporator for keeping the compressor off and atmospheric temperature.

For example, atmospheric temperature or pressure of refrigerant affects the load on refrigerating cycle R. The lower the actual atmospheric temperature is than predetermined atmospheric temperature, the higher TLim is set. TLim is set as the same temperature as Ton when actual atmospheric temperature is the same as predetermined atmospheric temperature. As shown in FIG. 4, defining ΔT as predetermined atmospheric temperature minus actual atmospheric temperature, the larger ΔT is, the higher TLim is set than Ton. The cooling power needed in the vehicle compartment is less when the actual atmospheric temperature is lower than the predetermined atmospheric temperature than when the actual atmospheric temperature is the same as the predetermined atmospheric temperature. The driver does not feel hot regardless of the higher temperature of evaporator 11 in the former case, when compared with the latter case. Actual atmospheric temperature is detected with atmospheric temperature sensor 57.

Figure 5:
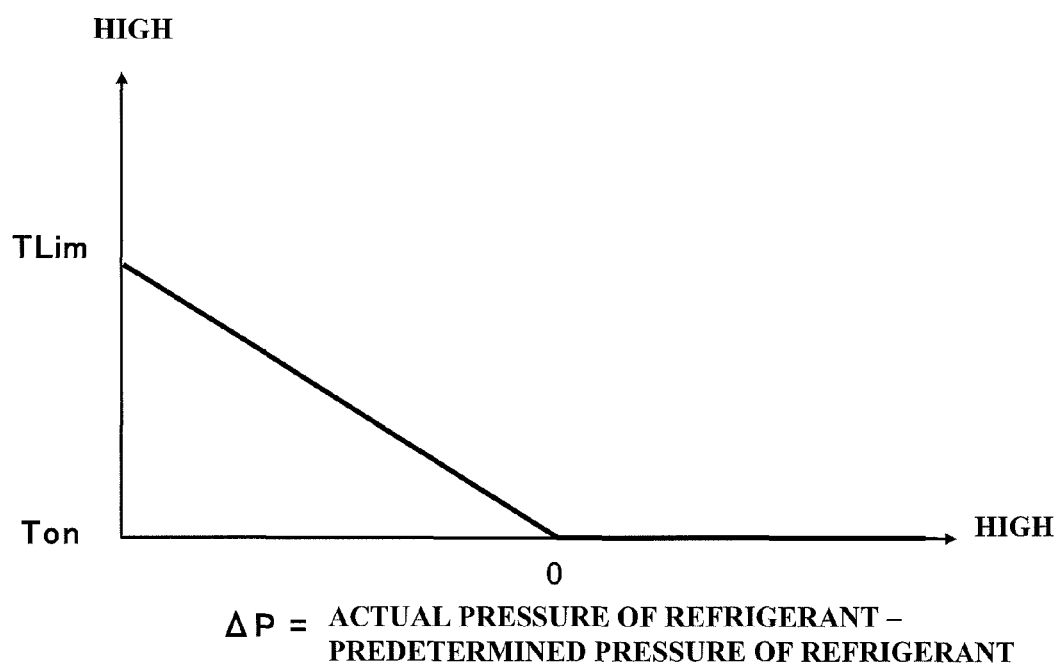
FIG. 5 is a graph showing a relationship between a higher limit temperature of the evaporator for keeping the compressor off and pressure of refrigerant.

The load on compressor 1 is small when the pressure of the refrigerant (the pressure of refrigerant in outlet of compressor 1) is small. In other wards, the load on refrigerant cycle R is small. The lower the actual pressure of refrigerant is than the predetermined pressure of the refrigerant, the higher TLim is set. TLim is set as the same temperature as Ton when the actual pressure of the refrigerant is the same as the predetermined pressure of refrigerant. As shown in FIG. 5, defining ΔP as the actual pressure of the refrigerant minus the predetermined pressure of the refrigerant, the smaller ΔP is, the higher TLim is set than Ton. The load on compressor 1 to maintain cooling power is small when the actual pressure of the refrigerant is smaller than the predetermined pressure of refrigerant. The driver does not feel hot regardless of higher temperature of evaporator 11 when the actual pressure of the refrigerant is lower than the predetermined pressure of the refrigerant, when compared with the actual pressure of refrigerant being the same as the predetermined pressure of the refrigerant.

Whenever the aforementioned three requirements are fulfilled, the process determines that the vehicle compartment is comfortable while compressor 1 is prevented from turning ON, and compressor 1 is kept in the OFF state during fuel cut-off. In this condition, fuel cut-off is kept in step S6 and compressor 1 is kept in the OFF state in step S7.

When <Requirement 3> is not met in step S5, fuel supply is recovered immediately in step S8 and compressor 1 is turned on in step S9. The driver feels hot by capability of air-conditioner falling down in relative low atmospheric temperature when Teva is higher than TLim. Then the general control to turn compressor ON/OFF is done the same as in the conventional device.

When <Requirement 2> is not met in step 4, e.g., vehicle speed V is in the range Vacrec≤V≤Vfc, fuel cut-off is kept in step S10. The range Vacrec≤V≤Vfc means that vehicle speed V is between vehicle speed Vfc for starting deceleration fuel cut-off and vehicle speed Vacrec for fuel supply recovery with air-conditioner ON. Fuel cut-off continues primarily in the range of this vehicle speed before the vehicle speed reaches Vacrec.

When <Requirement 1> is not met in step S3, the general control to turn compressor ON/OFF is done the same as conventional device and compressor 1 is turned on immediately in step 11.

Next, an operation according to one or more embodiments of the present disclosure is explained with reference to FIG. 2. As explained above, one or more embodiments of the present disclosure is indicated by solid lines.

It is shown in the fifth chart in FIG. 2 that the temperature of evaporator is equal to or higher than Ton and is equal to or lower than TLim when the vehicle speed V is in the range expressed in the equation: Vrec<V<Vacrec. Amplifier controller of present embodiment continues fuel cut-off from t4 to t6 when the controller determines that the comfort in the vehicle compartment is maintained without turning on the compressor 1 and keeping the compressor 1 off. As the result, the period from t4 to t6 is an extension period of fuel cut-off.

Figure 3:
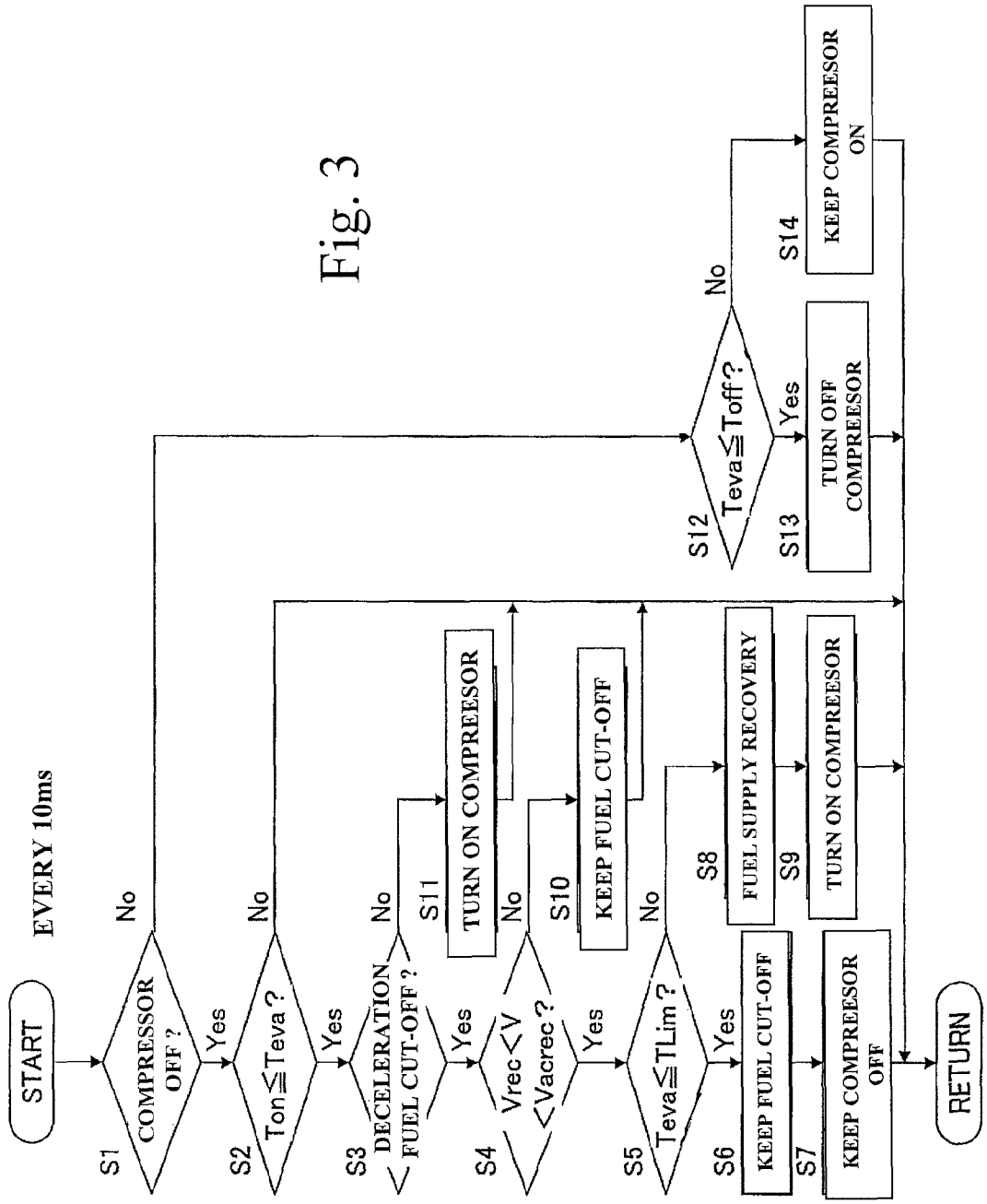
FIG. 3 shows a flow chart explaining a control of compressor in vehicle deceleration fuel cut-off.

One or more embodiments of the present disclosure does not have an evaluating step for requesting turning on of the compressor 1 between steps S4 and step S5 in FIG. 3. Fuel cut-off is maintained regardless of a request for turning compressor on, whenever the temperature of compressor is equal to or higher than Ton and is equal to or lower than TLim.

The conventional device turns on the compressor immediately at t5 when the request for turning on the compressor is generated at t5. On the contrary, one or more embodiments of the present disclosure maintains fuel cut-off and compressor off after t5 regardless of request for turning compressor on at t5, and recovers fuel supply at t6. The period of fuel cut-off is extended from t5 to t6 in one or more embodiments of the present disclosure when compared with that in the conventional device.

The vehicle air-conditioner control system according to one or more embodiments of the present disclosure comprises compression refrigerating cycle R including a compressor that intakes, compresses and discharges refrigerant, a condenser that condenses a high temperature and high pressure refrigerant discharged from the compressor, an expansion valve 10 that depressurizes the refrigerant condensed by the condenser such that the refrigerant is at low pressure, and an evaporator that performs heat exchange between open air and refrigerant, which in turn vaporizes the refrigerant.

According to one or more embodiments of the present disclosure, the vehicle air-conditioner control system comprises amplifier controller 51 (a compressor on/off control means) which can control the running of compressor, engine control module 5 (a vehicle deceleration fuel cut-off executing means and a fuel supply recovery executing means) which performs cut-off fuel supply during vehicle deceleration, and which cancels fuel cut-off and recovers fuel supply at an earlier time in condition of the vehicle deceleration fuel cut-off with air-conditioner ON than in condition of the vehicle deceleration fuel cut-off with air-conditioner OFF. Amplifier controller 51 keeps the compressor turned off and prohibits fuel supply recovery, even if the demand to turn on the compressor is generated before the vehicle speed reaches the vehicle speed Vrec for fuel supply recovery with air-conditioner OFF (the demand to turn off the compressor), after the vehicle speed goes down below the vehicle speed Vacrec for fuel supply recovery with air-conditioner ON (the demand to turn on the compressor) during deceleration fuel cut-off with compressor 1 OFF (OFF state of compressor 1), as shown in steps S1, S2, S3, S4, S5, S6 and S7 in FIG. 3. One or more embodiments of the present disclosure extends the period of fuel cut-off and improves fuel efficiency when compared with the conventional device which recovers fuel supply immediately and turn on the compressor 1 when the demand to compressor turning on is generated between Vacrec and Vrec.

In one or more embodiments of the present disclosure, the determination of whether or not fuel supply recovery is prohibited and compressor is kept OFF is made according to the load of the refrigerating cycle, as shown in step 5, 6 and 7 in FIG. 3. Because of this, the determination is done accurately even if the load of refrigerating cycle is variable.

In one or more embodiments of the present disclosure, as shown in FIG. 4, the load of refrigerating cycle is atmospheric temperature, so higher limit temperature TLim of evaporator for the compressor kept off is determined according to the atmospheric temperature. A determination is made to prohibit the fuel supply recovery and to keep compressor OFF (no running of compressor) when Teva is equal to or lower than TLim, as shown in step S5, S6 and S7 in FIG. 3. Because of this, the above determination is made accurately even if atmospheric temperature is variable.

In one or more embodiments of the present disclosure, the period in which fuel supply recovery is prohibited and compressor is kept OFF (no running of compressor) is limited to the moment that vehicle speed reaches the vehicle speed Vrec for fuel supply recovery with air-conditioner OFF (the demand to turn off the compressor), as shown in step S4, S6 and S7 in FIG. 3. Fuel cut-off is extended, while a deterioration of cooling power in vehicle compartment caused by the prohibition of turning on compressor 1 is kept at a minimum.

In one or more embodiments of the present disclosure, it is explained that the period in which fuel supply recovery is prohibited and compressor is kept OFF (no running of compressor) is limited to the moment that vehicle speed reaches the vehicle speed Vrec for fuel supply recovery with air-conditioner OFF. But one or more embodiments of the present disclosure is not limit in this case. For example, the period in which fuel supply recovery is prohibited and compressor is kept OFF (no running of compressor) can be a predetermined period from t4, or not reaching t6.

Compressor 1 is not explained in detail above. One or more embodiments of the present disclosure can be applied to both a compressor of the variable capacity or displacement type, and a compressor of the regulate or constant capacity type with an engagement controlled clutch.

In one or more embodiments of the present disclosure, evaporator temperature Toff that requires the compressor to be turned off, and evaporator temperature Ton that requires the compressor turning on is defined (Ton and Toff are thresholds). The evaporator temperature is controlled not to cross the each threshold. This control is described under the assumption that a vehicle installed temperature sensor 52 is equipped for detecting evaporator temperature. However, one or more embodiments of the present disclosure may also be applicable to a vehicle controlling an evaporator temperature with a thermostat without having temperature sensor 52. In this vehicle, it is possible to define threshold of the period of prohibiting compressor ON according to the load on the refrigerating cycle and control the compressor.

However, cooling power of air conditioner may deteriorate when the compressor 1 is continued to be prohibited to turn ON, because accurate control of temperature with the temperature of evaporator 11 is not executed. To prevent this deterioration of cooling power, compressor 1 is not prohibited to turn on before the compressor turns on and off at minimum one time. The reason is that the temperature of evaporator is controlled by the thermostat after the compressor turns on and off at minimum one time.

According to one or more embodiments of the present invention, the fuel supply recovery time is defined by vehicle speed. This is envisaged because vehicle speed provides an accurate estimate as to whether an engine stall occurs. However, other parameters are also available with which it can be judged whether an engine stall occurs. For example, the fuel supply recovery time may be measured or predicted based on a predetermined engine rotation speed.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A vehicle air conditioner control system comprising:
an air conditioning device for performing a refrigerating cycle, comprising:
a compressor that intakes, compresses, and discharges a refrigerant;
a condenser that condenses the refrigerant discharged from the compressor;
an expansion valve that depressurizes the refrigerant condensed by the condenser;
an evaporator that performs heat exchange between open air and the refrigerant to vaporize the refrigerant;
a compressor ON/OFF control device that controls a running rate of the compressor by alternating between an ON state and an OFF state;
a vehicle deceleration fuel cut-off executing device that performs cut-off of a vehicle fuel supply during vehicle deceleration; and
a fuel supply recovery executing device that cancels fuel cut-off and recovers fuel supply during a vehicle deceleration fuel cut-off period based on a demand to turn on the compressor,
wherein the compressor ON/OFF control device keeps the OFF state of the compressor and prohibits fuel supply recovery even when the demand to turn on the compressor is generated, if a vehicle speed is between a first vehicle speed for fuel supply recovery with the demand to turn off the compressor and a second vehicle speed for fuel supply recovery with the demand to turn on the compressor during deceleration fuel cut-off with OFF state of the compressor.

2. The vehicle air conditioner control system as claimed in claim 1,
wherein whether the compressor ON/OFF control device maintains the OFF state of the compressor and prohibits fuel supply recovery is decided according to a load on the refrigerating cycle R.

3. The vehicle air conditioner control system as claimed in claim 2,
wherein the load on the refrigerating cycle R is determined based on an atmospheric temperature,
an upper limit temperature to keep the OFF state of the compressor is determined according to the atmospheric temperature, and
the compressor ON/OFF control device decides to maintain the OFF state of the compressor and to prohibit fuel supply recovery when a temperature of the evaporator is equal to or lower than the upper limit temperature.

4. The vehicle air conditioner control system as claimed in claim 2,
wherein a period in which the compressor ON/OFF control device maintains the OFF state of the compressor and prohibits fuel supply recovery is terminated at the vehicle speed for fuel supply recovery with the OFF state of the compressor.

5. The vehicle air conditioner control system as claimed in claim 3,
wherein a period in which the compressor ON/OFF control device maintains the OFF state of the compressor and prohibits fuel supply recovery is terminated at the vehicle speed for fuel supply recovery with the OFF state of the compressor.

6. A vehicle air conditioner control system comprising:
an air conditioning device for performing a refrigerating cycle, comprising:
a compressor that intakes, compresses, and discharges a refrigerant;
a condenser that condenses the refrigerant discharged from the compressor;
an expansion valve that depressurizes the refrigerant condensed by the condenser;
an evaporator that performs heat exchange between open air and the refrigerant to vaporize the refrigerant;
a compressor ON/OFF control means that controls a running rate of the compressor by alternating between an ON state and an OFF state;
a vehicle deceleration fuel cut-off executing means that performs cut-off of a vehicle fuel supply during vehicle deceleration; and
a fuel supply recovery executing means that cancels fuel cut-off and recovers fuel supply during a vehicle deceleration fuel cut-off period based on a demand to turn on the compressor,
wherein the compressor ON/OFF control means keeps the OFF state of the compressor and prohibits fuel supply recovery even when the demand to turn on the compressor is generated, if a vehicle speed is between a first vehicle speed for fuel supply recovery with the demand to turn off the compressor and a second vehicle speed for fuel supply recovery with the demand to turn on the compressor during deceleration fuel cut-off with OFF state of the compressor.

7. The vehicle air conditioner control system as claimed in claim 6,
wherein whether the compressor ON/OFF control means maintains the OFF state of the compressor and prohibits fuel supply recovery is decided according to a load on the refrigerating cycle R.

8. The vehicle air conditioner control system as claimed in claim 7,
wherein the load on the refrigerating cycle R is determined based on an atmospheric temperature,
an upper limit temperature to keep the OFF state of the compressor is determined according to the atmospheric temperature, and
the compressor ON/OFF control means decides to maintain the OFF state of the compressor and to prohibit fuel supply recovery when a temperature of the evaporator is equal to or lower than the upper limit temperature.

9. The vehicle air conditioner control system as claimed in claim 7,
wherein a period in which the compressor ON/OFF control device maintains the OFF state of the compressor and prohibit fuel supply recovery is terminated at the vehicle speed for fuel supply recovery with the OFF state of the compressor.

10. The vehicle air conditioner control system as claimed in claim 8,
wherein a period in which the compressor ON/OFF control device maintains the OFF state of the compressor and prohibits fuel supply recovery is terminated at the vehicle speed for fuel supply recovery with the OFF state of the compressor.

* * * * *